United States Patent
Hasan et al.

(10) Patent No.: US 11,073,051 B2
(45) Date of Patent: Jul. 27, 2021

(54) COMBINATION OIL CONTROL VALVE AND FUEL INJECTOR DRIVER

(71) Applicant: GM GLOBAL TECHNOLOGY OPERATIONS LLC, Detroit, MI (US)

(72) Inventors: S.M. Nayeem Hasan, Novi, MI (US); Timothy P. Philippart, Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 219 days.

(21) Appl. No.: 16/449,735

(22) Filed: Jun. 24, 2019

(65) Prior Publication Data
US 2020/0400044 A1 Dec. 24, 2020

(51) Int. Cl.
| | |
|---|---|
| *F01L 1/344* | (2006.01) |
| *F01M 9/10* | (2006.01) |
| *F02D 7/00* | (2006.01) |
| *F01L 1/053* | (2006.01) |
| *F01L 1/047* | (2006.01) |

(52) U.S. Cl.
CPC ............ *F01L 1/3442* (2013.01); *F01M 9/10* (2013.01); *F02D 7/007* (2013.01); *F01L 2001/0476* (2013.01); *F01L 2001/0535* (2013.01); *F01L 2001/0537* (2013.01); *F01L 2001/34433* (2013.01)

(58) Field of Classification Search
CPC ............... F02D 41/20; F02D 2041/202; F02D 2041/2048; F02D 2041/2051; F02D 2041/2068; F02D 7/007
See application file for complete search history.

(56) References Cited

U.S. PATENT DOCUMENTS

| | | | | |
|---|---|---|---|---|
| 5,936,827 A | * | 8/1999 | Dressler .................. | F02D 41/20 361/154 |
| 2011/0283975 A1 | * | 11/2011 | Wirrer ..................... | F02D 41/20 123/478 |
| 2014/0069390 A1 | * | 3/2014 | Nishimura ............. | F02D 41/20 123/478 |
| 2016/0160783 A1 | * | 6/2016 | Fujita .................... | F02D 41/221 701/103 |

* cited by examiner

*Primary Examiner* — Hung Q Nguyen
(74) *Attorney, Agent, or Firm* — Harness, Dickey & Pierce, P.L.C.

(57) ABSTRACT

A first high side switch is configured to connect and disconnect a first reference potential to and from a first node, the first node configured to be electrically connected to a second node and a first end of a first inductor coil of a fuel injector of a cylinder and a first end of a second inductor coil of an oil control valve of the cylinder. A second high side switch is configured to connect and disconnect a second reference potential to and from the second node. A first low side switch is configured to connect and disconnect a ground reference potential to and from a second end of the second inductor coil of the oil control valve. A second low side switch is configured to connect and disconnect the ground reference potential to and from a second end of the first inductor coil of the fuel injector.

20 Claims, 6 Drawing Sheets

COMBINATION OIL CONTROL VALVE AND FUEL INJECTOR DRIVER

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to internal combustion engines of vehicles and more particularly to drivers for direct injection fuel injectors and oil control valves of engines.

Vehicles include an internal combustion engine that generates drive torque. More specifically, an intake valve is selectively opened to draw air into a cylinder of the engine. The air mixes with fuel to form an air/fuel mixture that is combusted within the cylinder. The air/fuel mixture is compressed and combusted to drive a piston within the cylinder. An exhaust valve selectively opens to allow the exhaust gas resulting from combustion to exit the cylinder.

A rotating camshaft regulates the opening and closing of the intake and/or exhaust valves. The camshaft includes cam lobes that are fixed to and rotate with the camshaft. The geometric profile of a cam lobe generally controls the period that the valve is open (duration) and the magnitude or degree to which the valve opens (lift). A camshaft phaser regulates phasing of the camshaft relative to a crankshaft.

Variable valve actuation (VVA), also called variable valve lift (VVL) improves fuel economy, engine efficiency, and/or performance by modifying valve lift and duration. Two-step VVA systems include VVL mechanisms, such as switchable roller finger followers (SRFFs). A SRFF associated with a valve (e.g., an intake or an exhaust valve) allows the valve to be lifted in two discrete modes: a low lift mode and a high lift mode.

An engine control module (ECM) controls the torque output of the engine. For example only, the ECM controls the torque output of the engine based on driver inputs and/or other inputs. The driver inputs may include, for example, an accelerator pedal position, a brake pedal position, inputs to a cruise control system, and/or other driver inputs. The other inputs may include inputs from various vehicle systems, such as a transmission control system.

SUMMARY

In a feature, an engine control system includes: a first high side switch configured to connect and disconnect a first reference potential to and from a first node, respectively, the first node configured to be electrically connected to: a second node and a first end of a first inductor coil of a fuel injector of a cylinder; and a first end of a second inductor coil of an oil control valve of the cylinder; a second high side switch configured to connect and disconnect a second reference potential to and from the second node, respectively; a first low side switch configured to connect and disconnect a ground reference potential to and from a second end of the second inductor coil of the oil control valve of the cylinder, respectively; and a second low side switch configured to connect and disconnect the ground reference potential to and from a second end of the first inductor coil of the fuel injector of the cylinder, respectively.

In further features, the second reference potential is greater than the first reference potential.

In further features, a first diode has a first anode is connected to the first node and a first cathode connected to the second node.

In further features, a second diode has a second anode connected to the first node and a second cathode is connected to the first end of the second inductor coil of the oil control valve of the cylinder.

In further features, a third diode has a third cathode connected to the second node and a third anode connected to the ground reference potential.

In further features, a fourth diode has a fourth anode connected between the second end of the first inductor coil of the fuel injector and the second low side switch and a fourth cathode connected to the second reference potential.

In further features, a fifth diode has a fifth anode connected to the ground reference and a fifth cathode connected between the second cathode of the second diode and the first end of the second inductor coil of the oil control valve.

In further features, the first and second high side switches are field effect transistors (FETs) and the first and second low side switches are FETs.

In further features, a cylinder control module is configured to close the first high side switch and the first low side switch to deactivate opening of intake and exhaust valves of the cylinder.

In further features, a fuel control module is configured to open the second low side switch to prevent fuel injection by the fuel injector when the first low side switch is closed.

In further features, a fuel control module is configured to, during a first portion of a fuel injection event for the cylinder: close the second high side switch; close the second low side switch; and open the first high side switch.

In further features, the fuel control module is further configured to, during a second portion of the fuel injection event for the cylinder: open the second high side switch; close the second low side switch; and close the first high side switch.

In further features, a cylinder control module is configured to open the first low side switch when the second low side switch is closed.

In further features, the second portion of the fuel injection event immediately follows the first portion of the fuel injection event.

In further features, the second reference potential is greater than the first reference potential.

In further features, the fuel injector is configured to inject fuel directly into the cylinder.

In a feature, an engine control method includes: by a first high side switch, selectively connecting and disconnecting a first reference potential to and from a first node, respectively, the first node configured to be electrically connected to: a second node and a first end of a first inductor coil of a fuel injector of a cylinder; and a first end of a second inductor coil of an oil control valve of the cylinder; by a second high side switch, selectively connecting and disconnecting a second reference potential to and from the second node, respectively; by a first low side switch, selectively connecting and disconnecting a ground reference potential to and from a second end of the second inductor coil of the oil control valve of the cylinder, respectively; and by a second low side switch, selectively connecting and disconnecting the ground reference potential to and from a second end of the first inductor coil of the fuel injector of the cylinder, respectively.

In further features, the second reference potential is greater than the first reference potential.

In further features, the engine control method further includes closing the first high side switch and the first low side switch to deactivate opening of intake and exhaust valves of the cylinder.

In further features, the engine control method further includes, during a first portion of a fuel injection event for the cylinder: closing the second high side switch; closing the second low side switch; and opening the first high side switch.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 3 includes examples of predetermined firing patterns for firing fractions (FF) of 2/9, 1/4, 3/7, and 4/9;

In the drawings, reference numbers may be reused to identify similar and/or identical elements.

DETAILED DESCRIPTION

Figure 1:
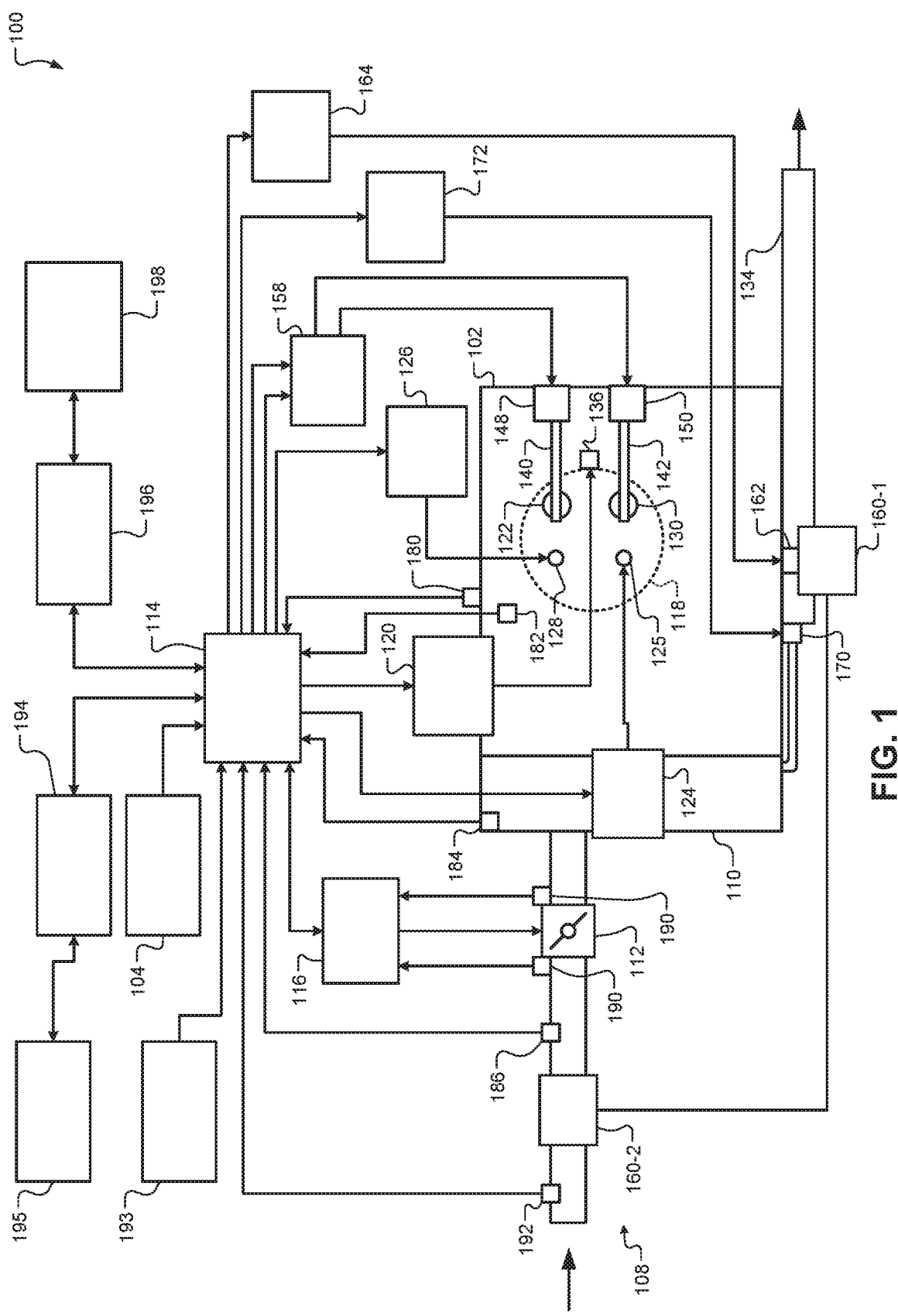
FIG. 1 is a functional block diagram of an example engine system.

Internal combustion engines combust an air and fuel mixture within cylinders to generate torque. Fuel may be directly injected into the cylinders using direct fuel injection. Under some circumstances, an engine control module (ECM) may deactivate one or more cylinders of the engine. The ECM may deactivate one or more cylinders, for example, to decrease fuel consumption when the engine can produce a requested amount of torque while one or more cylinders are deactivated.

The ECM determines a target firing fraction based on a requested amount of torque. The target firing fraction may correspond to a fraction of the cylinders that should be activated to achieve the requested amount of torque. For example, a target firing fraction of 5/8 may correspond to activating 5 out of 8 cylinders of the engine to achieve the requested amount of torque. With the target firing fraction of 5/8, the 3 out of the 8 cylinders will be deactivated.

The ECM determines a target firing sequence to achieve the target firing fraction and generates a firing command for a future (e.g., next) cylinder in a predetermined firing order of the cylinders according to the target firing sequence. The firing command may be a value that indicates whether the future cylinder should be activated or deactivated. For example, the ECM may set the firing command to 1 when the future cylinder should be activated and set the firing command to 0 when the future cylinder should be deactivated.

According to the present disclosure, a module includes components that are shared for performing both cylinder deactivation and fuel injection. The module includes a first high side switch configured to connect and disconnect a first reference potential (e.g., a battery voltage) to and from a first node. The first node is electrically connected to: a second node and a first end of a first inductor coil of a fuel injector of a cylinder; and a first end of a second inductor coil of an oil control valve of the cylinder. Thus, the first reference potential can be electrically connected (via the first high side switch) to the fuel injector (for fuel injection into the cylinder) or the oil control valve (for deactivation of the cylinder). A second high side switch is configured to connect and disconnect a second reference potential (that is greater than the first reference potential) to and from the second node. A first low side switch is configured to connect and disconnect a ground reference potential to and from a second end of the second inductor coil of the oil control valve. A second low side switch is configured to connect and disconnect the ground reference potential to and from a second end of the first inductor coil of the fuel injector.

The module described above can be used because fuel injection of a cylinder and deactivation of the cylinder are mutually exclusive events. Cylinders that are deactivated are not fueled. Cylinders that are fueled are not deactivated (i.e., are activated).

Because at least one switch is omitted, the module described above is less costly than a different module including both high side and low side switches for control of the oil control valve and two high side switches and a low side switch for control of the fuel injector. One module will be used per cylinder, so the overall cost can be reduced by at least the cost of the omitted switch multiplied by the total number of cylinders of the engine.

Referring now to FIG. 1, a functional block diagram of an example engine system 100 is presented. The engine system 100 of a vehicle includes an engine 102 that combusts an air/fuel mixture to produce torque based on driver input from a driver input module 104.

Air is drawn into the engine 102 through an intake system 108. The intake system 108 may include an intake manifold 110 and a throttle valve 112. For example only, the throttle valve 112 may include a butterfly valve having a rotatable blade. An engine control module (ECM) 114 controls a throttle actuator module 116, and the throttle actuator module 116 regulates opening of the throttle valve 112 to control airflow into the intake manifold 110.

Air from the intake manifold 110 is drawn into cylinders of the engine 102. While the engine 102 includes multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders under some circumstances, as discussed further below, which may improve fuel efficiency.

The engine 102 may operate using a four-stroke cycle or another suitable engine cycle. The four strokes of a four-stroke cycle, described below, will be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes. For four-stroke engines, one engine cycle may correspond to two crankshaft revolutions.

When the cylinder 118 is activated, an intake valve 122 is opened during the intake stroke, and air from the intake manifold 110 is drawn into the cylinder 118 through the intake valve 122. The ECM 114 controls a fuel actuator module 124, which regulates fuel injection by a fuel injector 125 to achieve a target air/fuel ratio. The fuel injector 125 injects fuel directly into the cylinder 118 when the cylinder 118 is activated. One or more direct injection (DI) fuel injectors are provided for each cylinder. The fuel actuator module 124 halts injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression causes ignition of the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. Some types of engines, such as homogenous charge compression ignition (HCCI) engines may perform both compression ignition and spark ignition. The timing of the spark may be specified relative to the time when the piston is at its topmost position, which will be referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with the position of the crankshaft. The spark actuator module 126 may disable provision of spark to deactivated cylinders or provide spark to deactivated cylinders.

During the combustion stroke, the combustion of the air/fuel mixture drives the piston down, thereby driving the crankshaft. The combustion stroke may be defined as the time between the piston reaching TDC and the time when the piston returns to a bottom most position, which will be referred to as bottom dead center (BDC).

When the cylinder 118 is activated, the piston begins moving up from BDC and expels the byproducts of combustion through an exhaust valve 130 during the exhaust stroke. The byproducts of combustion are exhausted from the vehicle via an exhaust system 134.

Opening of the intake valve 122 of the cylinder 118 is controlled by an intake camshaft 140, while opening of the exhaust valve 130 of the cylinder 118 is controlled by an exhaust camshaft 142. Opening of the intake and exhaust valves 122 and 130 is also controlled by an oil control valve (OCV) 136 of the cylinder 118. An OCV is provided for each cylinder so the cylinders can be individually activated or deactivated. When the OCV 136 is open, the intake valve 122 and the exhaust valve 130 are held closed throughout an engine cycle despite rotation of the intake camshaft 140 and the exhaust camshaft 142. Fueling of the cylinder 118 is disabled while the intake and exhaust valves 122 and 130 are held closed. The cylinder 118 is said to be deactivated for an engine cycle when the cylinder 118 is not fueled and the intake and exhaust valves 122 and 130 are held closed for the engine cycle.

When the OCV 136 is closed, the intake camshaft 140 opens the intake valve 122 via one or more intake cam lobes and the exhaust camshaft 142 opens the exhaust valve 130 via one or more exhaust cam lobes. The cylinder 118 is said to be activated for an engine cycle when the intake and exhaust valves 122 and 130 are opened and closed during the engine cycle. The cylinder actuator module 120 opens or closes the OCV 136 of the cylinder 118 based on whether the cylinder 118 is to be activated or deactivated. More specifically, the cylinder actuator module 120 opens the OCV 136 when the cylinder 118 is to be deactivated and closes the OCV 136 when the cylinder 118 is to be activated.

While separate intake and exhaust camshafts are shown, one camshaft having lobes for both the intake and exhaust valves may be used.

The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. In various implementations, cam phasing may be omitted. Variable valve lift (not shown) may also be controlled by the phaser actuator module 158. In various other implementations, opening of the intake valve 122 and/or the exhaust valve 130 may be controlled by actuators other than a camshaft, such as electromechanical actuators, electrohydraulic actuators, electromagnetic actuators, etc.

The engine system 100 may include one or more boost devices, such as a turbocharger or a supercharger, that provide(s) pressurized air to the intake manifold 110. For example, FIG. 1 shows a turbocharger including a turbocharger turbine 160-1 that is driven by exhaust gases flowing through the exhaust system 134. The turbocharger also includes a turbocharger compressor 160-2 that is driven by the turbocharger turbine 160-1 and that compresses air leading into the throttle valve 112. As discussed further below, the engine system 100 may include more than one boost device, such as sequential or parallel turbochargers.

A wastegate 162 controls exhaust flow through and bypassing the turbocharger turbine 160-1. Wastegates can also be referred to as (turbocharger) turbine bypass valves. The wastegate 162 may allow exhaust to bypass the turbocharger turbine 160-1 to reduce intake air compression provided by the turbocharger. The ECM 114 may control the turbocharger via a wastegate actuator module 164. The wastegate actuator module 164 may modulate the boost of the turbocharger by controlling an opening of the wastegate 162. In various implementations, multiple turbochargers may be controlled by the wastegate actuator module 164. The turbocharger(s) may have variable geometry, which may be controlled by a turbo actuator module (not shown).

A cooler (e.g., a charge air cooler or an intercooler) may dissipate some of the heat contained in the compressed air charge, which may be generated as the air is compressed. Although shown separated for purposes of illustration, the turbocharger turbine 160-1 and the turbocharger compressor 160-2 may be mechanically linked to each other, placing intake air in close proximity to hot exhaust. The compressed air charge may absorb heat from components of the exhaust system 134.

The engine system 100 may include an exhaust gas recirculation (EGR) valve 170, which selectively redirects exhaust gas back to the intake manifold 110. The EGR valve 170 may be located upstream of the turbocharger turbine 160-1. The EGR valve 170 may be controlled by an EGR actuator module 172.

Crankshaft position may be measured using a crankshaft position sensor 180. An engine speed may be determined based on the crankshaft position measured using the crankshaft position sensor 180. A temperature of engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

Position of the throttle valve 112 may be measured using one or more throttle position sensors (TPS) 190. A temperature of air being drawn into the engine 102 may be measured using an intake air temperature (IAT) sensor 192. The engine system 100 may also include one or more other sensors 193. The other sensors 193 may include an accelerator pedal position (APP) sensor, a brake pedal position (BPP) sensor, a clutch pedal position (CPP) sensor (e.g., in the case of a manual transmission), and may include one or more other types of sensors. An APP sensor measures a position of an accelerator pedal within a passenger cabin of the vehicle. A BPP sensor measures a position of a brake pedal within the passenger cabin of the vehicle. A CPP sensor measures a position of a clutch pedal within the passenger cabin of the vehicle. The ECM 114 may use signals from the sensors to make control decisions for the engine system 100.

The ECM 114 may communicate with a transmission control module 194, for example, to coordinate engine operation with gear shifts in a transmission 195. For example, the ECM 114 may reduce engine torque during a gear shift.

The ECM 114 may communicate with a hybrid control module 196, for example, to coordinate operation of the engine 102 and an electric motor 198. The electric motor 198 may also function as a generator, and may be used to produce electrical energy for use by vehicle electrical systems and/or for storage in a battery. While only the electric motor 198 is shown and discussed, multiple electric motors may be implemented. In various implementations, various functions of the ECM 114, the transmission control module 194, and the hybrid control module 196 may be integrated into one or more modules.

The ECM 114 may selectively start and shut down the engine 102 between times when the vehicle is started and when the vehicle is next shut down. A user may start the vehicle, for example, by actuating an ignition key, button, or switch. A user may shut down the vehicle, for example, by actuating the ignition key, button, or switch.

The electric motor 198 may be coupled to the transmission 195 and used for vehicle propulsion and stopping. For example, in some types of vehicles, the engine 102 may be operated only to generate power for the electric motor 198 (e.g., when a state of charge of a battery pack of the vehicle falls below a predetermined state of charge), and the electric motor 198 may be used at all times for vehicle propulsion. In other types of vehicles, the electric motor 198 may be used for vehicle propulsion at times when the engine 102 is shut down and at times when the engine 102 is running (e.g., to supplement engine torque output).

Each system of the engine 102 that varies an engine parameter may be referred to as an engine actuator. Each engine actuator has an associated actuator value. For example, the throttle actuator module 116 may be referred to as an engine actuator, and the throttle opening area may be referred to as the actuator value. In the example of FIG. 1, the throttle actuator module 116 achieves the throttle opening area by adjusting an angle of the blade of the throttle valve 112.

The spark actuator module 126 may also be referred to as an engine actuator, while the corresponding actuator value may be the amount of spark timing. Other engine actuators may include the cylinder actuator module 120, the fuel actuator module 124, the phaser actuator module 158, the wastegate actuator module 164, and the EGR actuator module 172. For these engine actuators, the actuator values may correspond to a cylinder activation/deactivation sequence (or firing fraction), fueling rate, intake and exhaust cam phaser angles, target wastegate opening, and EGR valve opening, respectively. The ECM 114 may control the actuator values in order to cause the engine 102 to generate a requested engine output torque.

Figure 2:
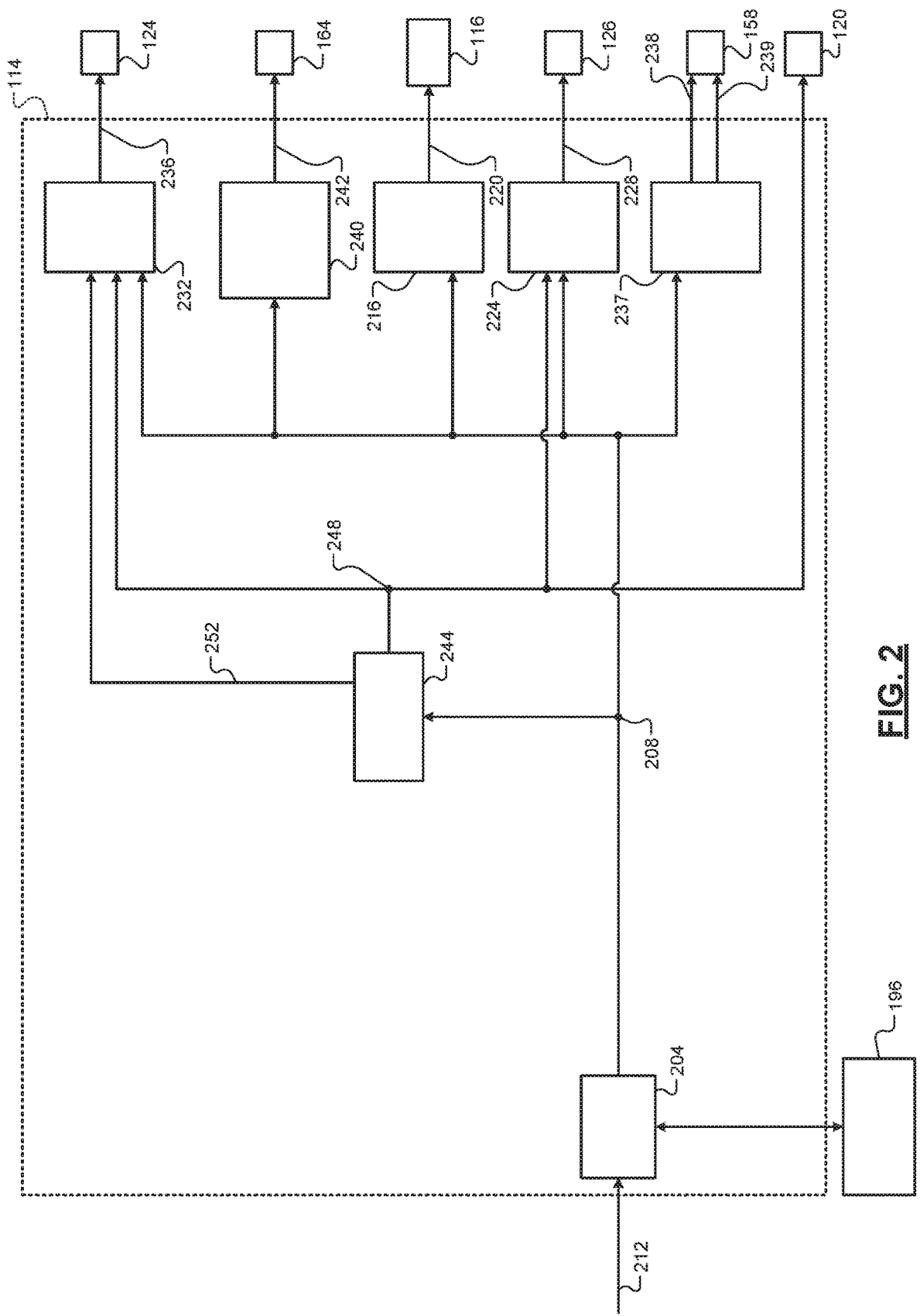
FIG. 2 is a functional block diagram of an example engine control system.

Referring now to FIG. 2, a functional block diagram of an example engine control system is presented. A torque request module 204 determines a torque request 208 for the engine 102 based on one or more driver inputs 212. The driver inputs 212 may include, for example, an accelerator pedal position, a brake pedal position, a clutch pedal position, a cruise control input, and/or one or more other suitable driver inputs. The torque request module 204 may determine the torque request 208, for example, using one or more lookup tables or equations that relate driver input(s) to torque requests. For example, the torque request 208 may increase as the accelerator pedal position increases (relative to a predetermined resting accelerator pedal position, such as zero) and vice versa. The torque request module 204 may determine the torque request 208 additionally or alternatively based on one or more other torque requests, such as torque requests generated by the ECM 114 and/or torque requests received from other modules of the vehicle, such as the transmission control module 194, the hybrid control module 196, a chassis control module, etc.

One or more engine actuators are controlled based on the torque request 208 and/or one or more other parameters. For example, a throttle control module 216 may determine a target throttle opening 220 based on the torque request 208. The throttle actuator module 116 may adjust opening of the throttle valve 112 based on the target throttle opening 220.

A spark control module 224 determines a target spark timing 228 based on the torque request 208. The spark actuator module 126 generates spark based on the target spark timing 228.

A fuel control module 232 determines one or more target fueling parameters 236 based on the torque request 208. For example, the target fueling parameters 236 may include a target equivalence ratio (EQR) request, a number of fuel injections for injecting the amount, and a timing for each of the injections. The fuel actuator module 124 injects fuel based on the target fueling parameters 236.

A phaser control module 237 determines target intake and exhaust cam phaser angles 238 and 239 based on the torque request 208. The phaser actuator module 158 may regulate the intake and exhaust cam phasers 148 and 150 based on the target intake and exhaust cam phaser angles 238 and 239, respectively.

A wastegate control module 240 sets a target wastegate opening 242 based on the torque request 208. The wastegate actuator module 164 controls opening of the wastegate 162 based on the target wastegate opening 242. For example only, the wastegate actuator module 164 may determine a target duty cycle (DC) to apply to the wastegate 162 based on the target wastegate opening 242 using a function or mapping that relates target wastegate openings to target DCs. The wastegate actuator module 164 may apply a signal to the wastegate 162 based on the target DC.

A cylinder control module 244 generates an activation/deactivation command 248 for a next cylinder in a predetermined firing order of the cylinders ("the next cylinder"). The activation/deactivation command 248 indicates whether the next cylinder should be activated or deactivated. For example only, the cylinder control module 244 may set the activation/deactivation command 248 to a first state (e.g., 1) when the next cylinder should be activated and set the activation/deactivation command 248 to a second state (e.g., 0) when the next cylinder should be deactivated. While the activation/deactivation command 248 is and will be discussed as being generated for the next cylinder in the predetermined firing order, the activation/deactivation command 248 may be generated for a second cylinder immediately following the next cylinder in the predetermined firing order, a third cylinder immediately following the second cylinder in the predetermined firing order, or another cylinder following the next cylinder in the predetermined firing order.

The cylinder actuator module 120 opens the OCV of the next cylinder, thereby deactivating the intake and exhaust valves of the next cylinder, when the activation/deactivation command 248 indicates that the next cylinder should be deactivated. The cylinder actuator module 120 closes the OCV of the next cylinder, thereby allowing opening and closing of the intake and exhaust valves of the next cylinder, when the activation/deactivation command 248 indicates that the next cylinder should be activated.

The fuel control module 232 halts fueling of the next cylinder when the activation/deactivation command 248 indicates that the next cylinder should be deactivated. The fuel control module 232 sets the target fueling parameters 236 to provide fuel to the next cylinder when the activation/deactivation command 248 indicates that the next cylinder should be activated.

The spark control module 224 may provide spark to the next cylinder when the activation/deactivation command 248 indicates that the next cylinder should be activated. The spark control module 224 may provide or halt spark to the next cylinder when the activation/deactivation command 248 indicates that the next cylinder should be deactivated.

Cylinder deactivation is different than fuel cutoff (e.g., deceleration fuel cutoff). When a cylinder is deactivated, the cylinder's intake and exhaust valves are maintained closed, as described above, by opening the OCV of the cylinder. When fuel is cutoff to a cylinder, the cylinder's intake and exhaust valves may still be opened and closed (e.g., the OCV of the cylinder may be closed).

The cylinder control module 244 may generate the activation/deactivation command 248 based on a target firing fraction (FF) 252. A numerator of the target firing fraction 252 corresponds to a target number of cylinders to be activated (M) out of the next N cylinders in the predetermined firing order of the cylinders, and N is the denominator of the target firing fraction. For example, a target firing fraction of 5/8 indicates that 5 of the next 8 cylinders in the predetermined firing order should be activated. In this example, 3 of the next 8 cylinders in the predetermined firing order should therefore be deactivated. A target firing fraction of 0 (or 0/N) corresponds to all of the cylinders of the engine 102 being deactivated (and 0 being activated), and a target firing fraction of 1 (or N/N for example) corresponds to all of the cylinders of the engine 102 being activated (and 0 being deactivated).

Figure 3:
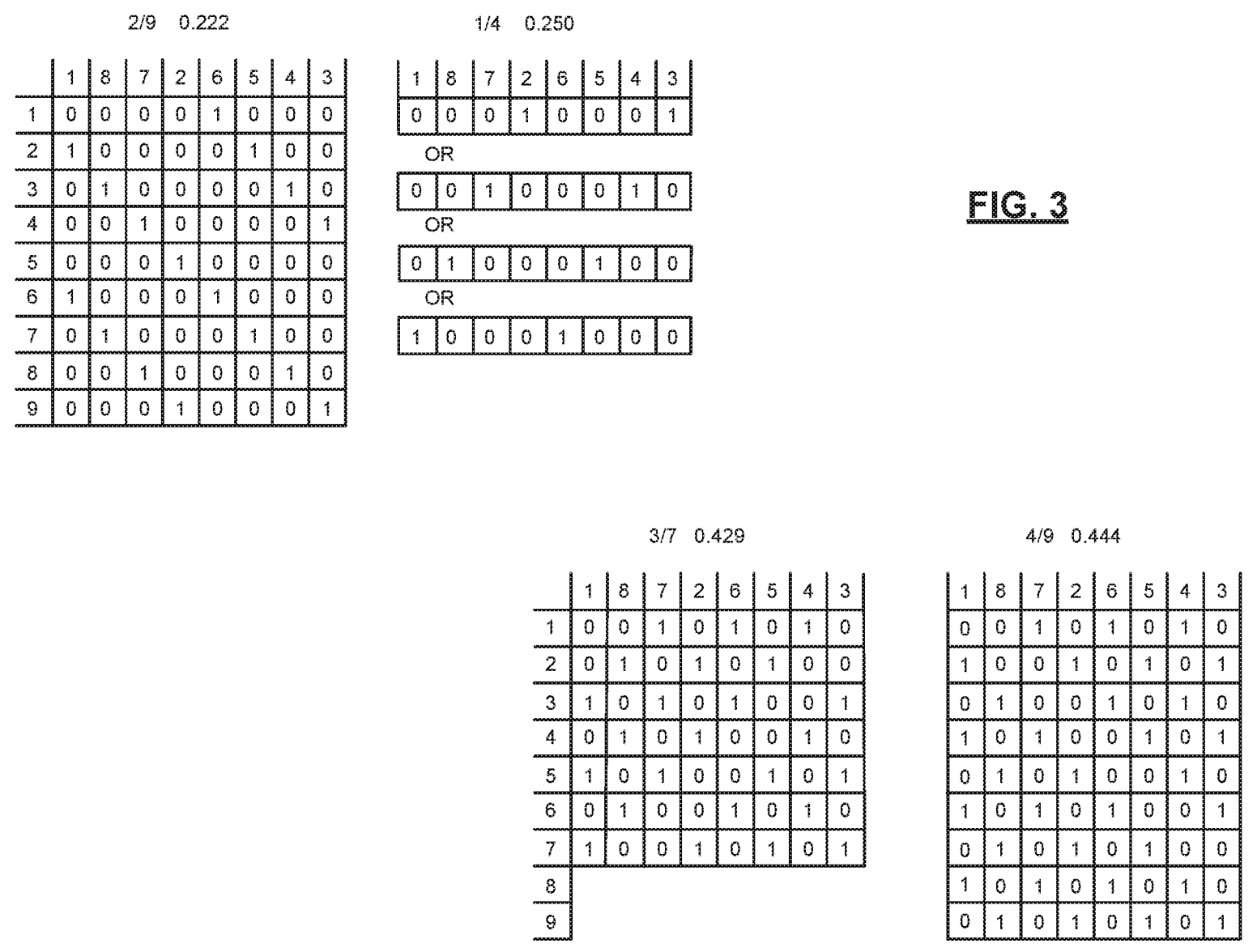

One or more predetermined firing patterns (or sequences) may be associated with each possible target firing fraction. Examples of predetermined firing patterns for firing fractions (FF) of 2/8, 1/4, 3/7, and 4/8 are provided in FIG. 3. In FIG. 3, a 1 indicates that the respective cylinder in the firing order should be activated (and fired), and a 0 indicates that the respective cylinder in the firing order should be deactivated (and not fired). The rows of FIG. 3 correspond to different engine cycles (1, 2, 3, 4, 5, 6, 7, 8, 9, etc.), while the columns are for the individual cylinders in the firing order (1, 8, 7, 2, 6, 5, 4, 3) of the cylinders. An engine cycle refers to the period necessary for all of the cylinders of the engine to undergo one complete combustion cycle (e.g., 2 crankshaft revolutions). In FIG. 3, the example of an 8 cylinder engine with the firing order of the cylinders being cylinder 1, cylinder 8, cylinder 7, cylinder 2, cylinder 6, cylinder 5, cylinder 4, then cylinder 3, then starting over with cylinder 1. Based on the target firing fraction 252, the cylinder control module 244 may select a predetermined firing pattern and generate the activation/deactivation command 248 according to the selected predetermined firing pattern.

The cylinder control module 244 may determine the target firing fraction 252, for example, based on the torque request 208 and/or one or more other vehicle operating parameters. For example, the cylinder control module 244 may increase the target firing fraction 252 as the torque request 208 increases and vice versa.

Figure 4:
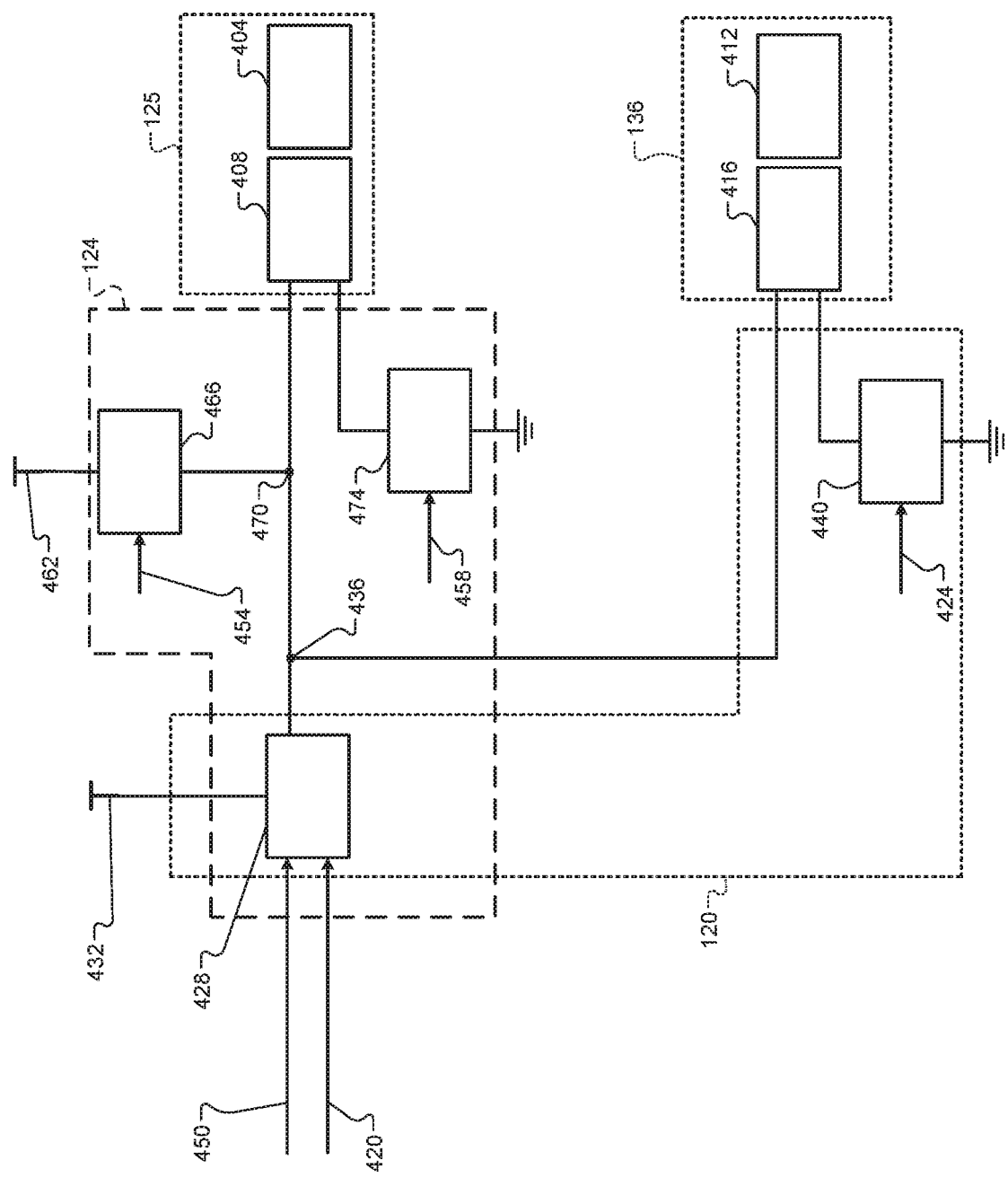
FIG. 4 is a functional block diagram of an example implementation of a combination of a cylinder actuator module and a fuel actuator module.
Figure 5:
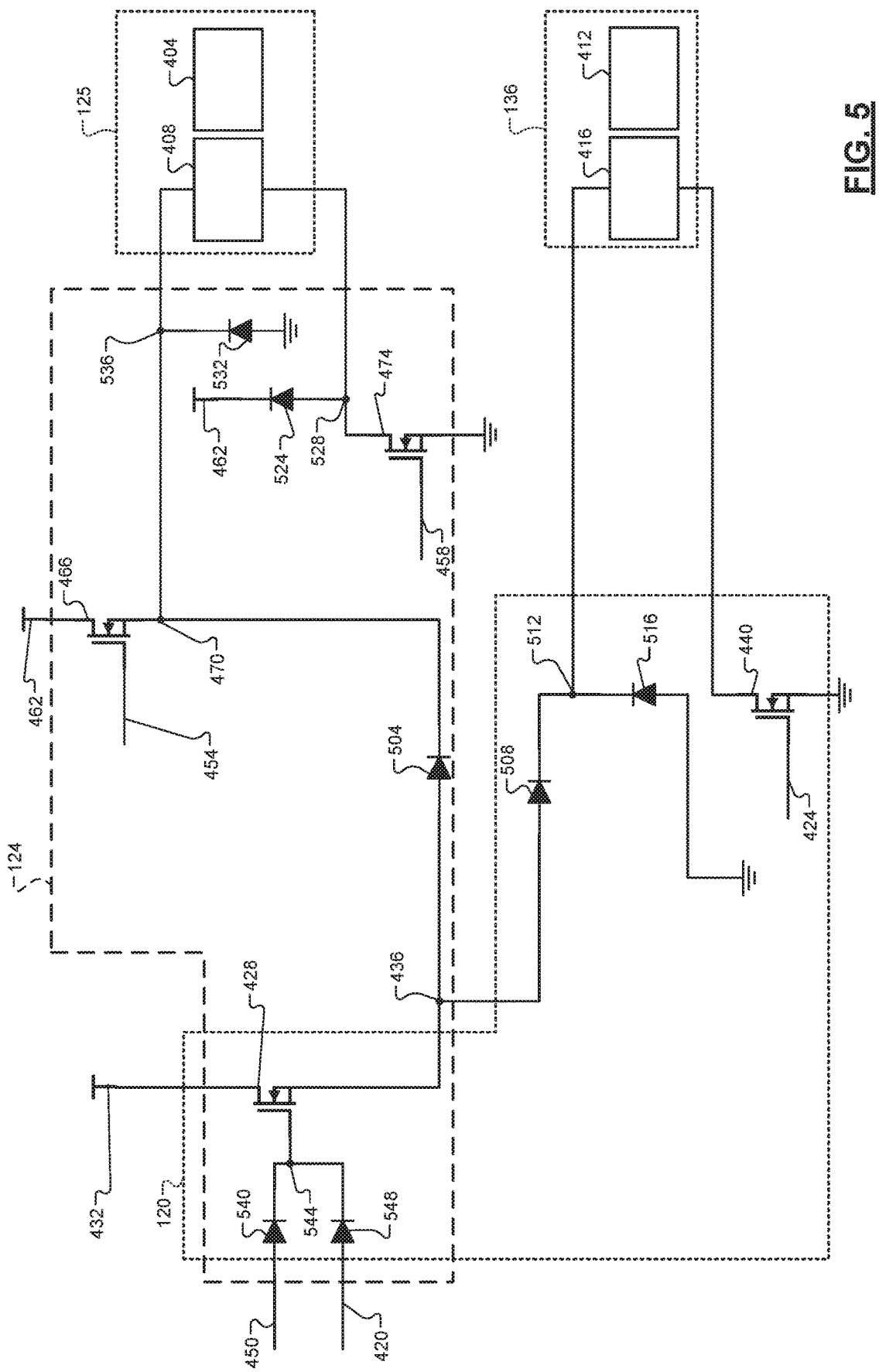
FIG. 5 is a schematic of an example implementation of a combination of a cylinder actuator module and a fuel actuator module.

FIG. 4 is a functional block diagram of an example implementation of a combination of the cylinder actuator module 120 and the fuel actuator module 124. FIG. 5 includes a schematic including an example implementation of the combination of the cylinder actuator module 120 and the fuel actuator module 124. In various implementations, the cylinder actuator module 120 and the fuel actuator module 124 may be implemented within the ECM 114. As illustrated, the cylinder actuator module 120 and the fuel actuator module 124 share components.

The fuel injector 125 includes a biasing device (e.g., a spring) that biases a spool 404 toward a closed position. The spool 404 may also be referred to as an armature. The fuel injector 125 also includes an inductor coil 408 that controls the actuation (opening and closing) of the spool 404. More specifically, when power is applied to the inductor coil 408 (i.e., when current flows through the inductor coil 408), the inductor coil 408 creates a magnetic field that overcomes the biasing force of the biasing device and pulls the spool 404 toward and to an open position. When power is not applied to the inductor coil 408, the inductor coil 408 does not generate magnetic field and the biasing device biases the spool 404 toward the closed position. When the spool 404 is in the closed position, the fuel injector 125 does not inject fuel into the cylinder 118. When the spool 404 is not in the closed position (i.e., in a position between the closed position and the open position or in the open position), the fuel injector 125 injects fuel into the cylinder 118.

Similarly, the OCV 136 includes a biasing device (e.g., a spring) that biases a spool 412 toward a closed position. The spool 412 may also be referred to as an armature. The OCV 136 also includes an inductor coil 416 that controls the actuation (opening and closing) of the spool 412. More specifically, when power is applied to the inductor coil 416 (i.e., when current flows through the inductor coil 416), the inductor coil 416 creates a magnetic field that overcomes the biasing force of the biasing device and pulls the spool 412 toward and to an open position. When power is not applied to the inductor coil 416, the inductor coil 416 does not generate magnetic field and the biasing device biases the spool 412 toward the closed position. When the spool 412 is in the closed position, the OCV 136 allows opening and closing of the intake and exhaust valves 122 and 130 and the cylinder 118 is activated. When the spool 412 is in the open position, the OCV 136 prevents the opening of the intake and exhaust valves 122 and 130 and the cylinder 118 is deactivated.

The cylinder control module 244 generates a deac signal (Deac) 420 and a deac enable signal (Deac Enable) 424 that control the application of power to the inductor coil 416 of the OCV 136. For example, the cylinder control module 244 may set the deac signal 420 and the deac enable signal 424 to a first state (e.g., 5 Volts) to apply power to the inductor coil 416 of the OCV 136. The cylinder control module 244 may set the deac enable signal 424 to a second state (e.g., 0 Volts) to not apply power to the inductor coil 416 of the OCV 136. The cylinder control module 244 also sets the deac signal 420 to the second state (e.g., 0 Volts) to not apply power to the inductor coil 416 of the OCV 136.

A first high side switch 428 opens and closes based on the deac signal 420. For example, the first high side switch 428 closes when the deac signal 420 is in the first state. The first high side switch 428 opens when the deac signal 420 is in the second state. The first high side switch 428 connects a first voltage (a first reference potential) 432 to a first node 436 when the first high side switch 428 is closed. The first high side switch 428 disconnects the first voltage 432 from the first node 436 when the first high side switch 428 is open. The first node 436 is connected to a first end of the inductor coil 416 of the OCV 136. The first voltage 432 may be received from a battery of the vehicle, such as a 12 V direct current (DC) vehicle battery or a battery having another suitable voltage.

A first low side switch 440 opens and closes based on the deac enable signal 424. For example, the first low side switch 440 closes when the deac enable signal 424 is in the first state. The first low side switch 440 is open when the deac enable signal 424 is in the second state. The first low side switch 440 connects a second end of the inductor coil 416 to a ground reference potential when the first low side switch 440 is closed. The first low side switch 440 disconnects the second end of the inductor coil 416 from the ground reference potential when the first low side switch 440 is open.

The cylinder control module 244 sets the deac signal 420 and the deac enable signal 424 to the first state when the cylinder 118 is to be deactivated (e.g., based on the activation/deactivation command 248). Thus, when the cylinder 118 is to be deactivated, the first voltage 432 is connected to the first end of the inductor coil 416 via the first high side switch 428 and the ground reference potential is connected to the second end of the inductor coil 416 via the first low side switch 440. The cylinder control module 244 sets the deac signal 420 and the deac enable signal 424 to the second state when the cylinder 118 is to be activated.

The fuel control module 232 generates a fuel hold signal (Fuel Hold) 450, a fuel peak signal (Fuel Peak) 454, and a fuel enable signal (Fuel Enable) 458 to control the application of power to the inductor coil 408. The fuel control module 232 controls opening of the fuel injector 125 using a peak and hold control strategy. More specifically, to begin a fuel injection event, the fuel control module 232 applies a second (higher) voltage 462 to the inductor coil 408 of the fuel injector 125 to quickly transition the spool 404 from the closed position to the open position. Once the spool 404 is in the open position, the fuel control module 232 applies the first (lower) voltage 432 to the inductor coil 408 of the fuel injector 125. The first voltage 432 is less than the second voltage 462, but is sufficient to maintain the spool 404 in the open position. The fuel control module 232 disconnects the inductor coil 408 from the first voltage 432 to end the fuel injection event and to transition the spool 404 back to the closed position.

The fuel control module 232 sets the fuel peak signal 454 and the fuel enable signal 458 to the first state (e.g., 5 Volts) to apply the second voltage 462 to the inductor coil 408 of the fuel injector 125. The fuel control module 232 sets the fuel hold signal 450 and the fuel enable signal 458 to the first state (e.g., 5 Volts) to apply the first voltage 432 to the inductor coil 408 of the fuel injector 125. The fuel control module 232 may set the fuel enable signal 458 to the second state (e.g., 0 Volts) to not apply power to the inductor coil 408 of the fuel injector 125. The fuel control module 232 also sets the fuel peak signal 454 and the fuel hold signal 450 to the second state (e.g., 0 Volts) to not apply power to the inductor coil 408 of the fuel injector 125.

The first high side switch 428 also opens and closes based on the fuel hold signal 450. For example, the first high side switch 428 closes when the fuel hold signal 450 is in the first state. The first high side switch 428 opens when the fuel hold signal 450 is in the second state.

Accordingly, the first high side switch 428 closes when either (i) the fuel hold signal 450 is in the first state or (ii) the deac signal 420 is in the first state. The first high side switch 428 opens when both of (i) the fuel hold signal 450 is in the second state and (ii) the deac signal 420 is in the second state. The first node 436 is also connected to the first end of the inductor coil 408 of the fuel injector 125.

A second high side switch 466 opens and closes based on the fuel peak signal 454. For example, the second high side switch 466 closes when the fuel peak signal 454 is in the first state. The second high side switch 466 is open when the fuel peak signal 454 is in the second state. The second high side switch 466 connects the second voltage (a second reference potential) 462 to a second node 470 when the second high side switch 466 is closed. The second node 470 is connected to the first node 436 and to the first end of the inductor coil 408. The second high side switch 466 disconnects the second voltage 462 from the second node 470 when the second high side switch 466 is open. The second voltage 462 is greater than the first voltage 432. For example only, the second voltage 462 may be approximately 55 V DC or another suitable voltage that is greater than the first voltage 432. A boost converter may generate the second voltage 462 from the first voltage 432.

A second low side switch 474 opens and closes based on the fuel enable signal 458. For example, the second low side switch 474 closes when the fuel enable signal 458 is in the first state. The second low side switch 474 is open when the fuel enable signal 458 is in the second state. The second low side switch 474 connects a second end of the inductor coil 408 to the ground reference potential when the second low side switch 474 is closed. The second low side switch 474 disconnects the second end of the inductor coil 408 from the ground reference potential when the second low side switch 474 is open.

The fuel control module 232 sets the fuel peak signal 454 and the fuel enable signal 458 to the first state from a beginning of a fuel injection event until the spool 404 is in the open position (e.g., for a predetermined period after the beginning of the fuel injection event). Thus, when the cylinder 118 is to be fueled (based on the target fueling parameters 236), the second voltage 462 is connected to the first end of the inductor coil 408 via the second high side switch 466 and the ground reference potential is connected to the second end of the inductor coil 408 via the second low side switch 474. Once the spool 404 is in the open position, the fuel control module 232 transitions the fuel hold signal 450 to the first state and the fuel peak signal 454 to the second state. The fuel control module 232 maintains the fuel enable signal 458 in the first state. Thus, the first (lower) voltage 432 is then connected to the first end of the inductor coil 408 via the first high side switch 428 and the ground reference potential is connected to the second end of the inductor coil 408 via the second low side switch 474. When fuel injection is to stop (based on the target fueling parameters 236), the fuel control module 232 transitions the fuel enable signal 458 and the fuel hold signal 450 to the second state. The fuel peak signal 454 is also in the second state. Thus, power is disconnected from the inductor coil 408 to stop fuel injection.

As shown in FIG. 5, a first diode 504 may be connected between the first node 436 and the second node 470. A second diode 508 may be connected between the first node 436 and a third node 512 that is connected to the first end of the inductor coil 416. A third diode 516 may be connected between the third node 512 and the ground reference potential.

A fourth diode 524 may be connected between the second voltage 462 and a fifth node 528 that is connected between the second end of the inductor coil 408 and the second low side switch 474. A fifth diode 532 may be connected between a sixth node 536 that is connected to the first end of the inductor coil 408 and the ground reference potential. A sixth diode 540 may be connected between a node where the fuel hold signal 450 is received and a seventh node 544 that is connected to a gate terminal of the first high side switch 428. A seventh diode 548 may be connected between a node where the deac signal 420 is received and the seventh node 544 that is connected to the gate terminal of the first high side switch 428.

Figure 6:
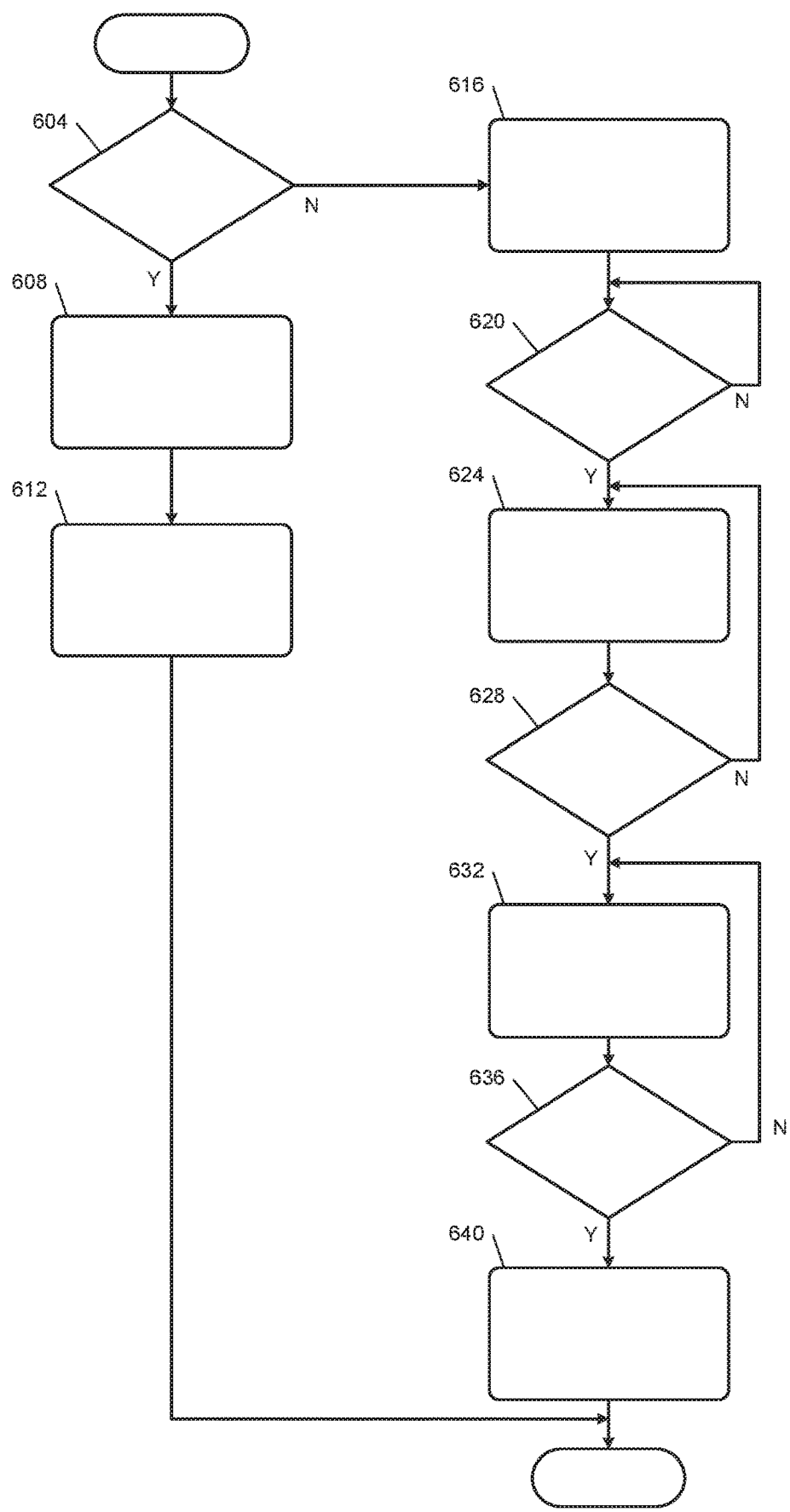
FIG. 6 is a flowchart depicting an example method of controlling cylinder deactivation and fueling using a combined cylinder actuator module and fuel actuator module.

FIG. 6 is a flowchart depicting an example method of controlling cylinder deactivation and fueling using the combination of the cylinder actuator module 120 and the fuel actuator module 124. Control begins with 604 where the fuel control module 232 and the cylinder control module 244 determine whether to deactivate the next cylinder in the predetermined firing order of the cylinders. If 604 is true, control continues with 608. If 604 is false, control transfers to 616, which is discussed further below.

At 608, when the next cylinder is to be deactivated, the cylinder control module 244 closes the first high side switch 428 and the first low side switch 440 to apply the first voltage 432 to the inductor coil 416 of the OCV 136. This opens the OCV 136 and holds the OCV 136 open. The intake and exhaust valves of the next cylinder remain closed when the OCV 136 is open. At 612, the fuel control module 232 maintains the second low side switch 474 open. This prevents the first voltage 432 from being applied to the inductor coil 408 of the fuel injector 125. The fuel control module 232 also maintains the second high side switch 466 open at 612. Thus, the fuel injector 125 does not inject fuel into the next cylinder as the next cylinder is to be deactivated.

At 616, when the next cylinder is to be activated, the cylinder control module 244 maintains the first low side switch 440 open. This prevents current flowing from the first voltage 432 through the inductor coil 416 of the OCV 136 and ensures that the OCV 136 is closed to allow opening and closing of the intake and exhaust valves of the next cylinder.

The first and second high side switches 428, 466 and the second low side switch 474 are also open at 616. At 620, the fuel control module 232 determines whether to begin fuel injection into the next cylinder. If 620 is true, control continues with 624. If 620 is false, control remains at 620.

At 624, the fuel control module 232 closes the second high side switch 466 and the second low side switch 624. This applies the second (higher) voltage 462 to the inductor coil 408 of the fuel injector 125 for the peak portion of the fuel injection event. The first low side switch 440 remains open at 624. At 628, the fuel control module 232 may determine whether the spool 404 has reached the open position. For example, the fuel control module 232 may determine whether a predetermined period has passed since application of the second voltage 462 to the inductor coil 408 began. If 628 is true, control continues with 632. If 628 is false, control returns to 624.

At 632, the fuel control module 232 closes the first high side switch 428 and opens the second high side switch 466. The fuel control module 232 also maintains the second low side switch 474 closed. This transitions to applying the first voltage 432 to the inductor coil 408 of the fuel injector 125 for the hold portion of the fuel injection event.

At 636, the fuel control module 232 determines whether to end the fuel injection event. If 636 is true, control continues with 640. If 636 is false, control returns to 632. At 640, the fuel control module opens the first high side switch 428 and the second low side switch 474 to close the fuel injector 125 and to transition the spool 404 to the closed position. While control is shown as ending after 612 or 640, control may return to 604. The example of FIG. 6 may be performed for each cylinder of the engine 102.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An engine control system, comprising:
a first high side switch configured to connect and disconnect a first reference potential to and from a first node, respectively,
the first node configured to be electrically connected to:
a second node and a first end of a first inductor coil of a fuel injector of a cylinder; and
a first end of a second inductor coil of an oil control valve of the cylinder;
a second high side switch configured to connect and disconnect a second reference potential to and from the second node, respectively;
a first low side switch configured to connect and disconnect a ground reference potential to and from a second end of the second inductor coil of the oil control valve of the cylinder, respectively; and
a second low side switch configured to connect and disconnect the ground reference potential to and from a second end of the first inductor coil of the fuel injector of the cylinder, respectively.

2. The engine control system of claim 1 wherein the second reference potential is greater than the first reference potential.

3. The engine control system of claim 1 further comprising a first diode having a first anode connected to the first node and a first cathode connected to the second node.

4. The engine control system of claim 3 further comprising a second diode having a second anode connected to the first node and a second cathode connected to the first end of the second inductor coil of the oil control valve of the cylinder.

5. The engine control system of claim 4 further comprising a third diode having a third cathode connected to the second node and a third anode connected to the ground reference potential.

6. The engine control system of claim 5 further comprising a fourth diode having a fourth anode connected between the second end of the first inductor coil of the fuel injector and the second low side switch and a fourth cathode connected to the second reference potential.

7. The engine control system of claim 6 further comprising a fifth diode having a fifth anode connected to the ground reference potential and a fifth cathode connected between the first cathode of the first diode and the first end of the first inductor coil of the fuel injector.

8. The engine control system of claim 1 wherein the first and second high side switches are field effect transistors (FETs) and the first and second low side switches are FETs.

9. The engine control system of claim 1 further comprising a cylinder control module configured to close the first high side switch and the first low side switch to deactivate opening of intake and exhaust valves of the cylinder.

10. The engine control system of claim 9 further comprising a fuel control module configured to open the second low side switch to prevent fuel injection by the fuel injector when the first low side switch is closed.

11. The engine control system of claim 1 further comprising a fuel control module configured to, during a first portion of a fuel injection event for the cylinder:
close the second high side switch;
close the second low side switch; and
open the first high side switch.

12. The engine control system of claim 11 wherein the fuel control module is further configured to, during a second portion of the fuel injection event for the cylinder:
open the second high side switch;
close the second low side switch; and
close the first high side switch.

13. The engine control system of claim 12 further comprising a cylinder control module configured to open the first low side switch when the second low side switch is closed.

14. The engine control system of claim 12 wherein the second portion of the fuel injection event immediately follows the first portion of the fuel injection event.

15. The engine control system of claim 11 wherein the second reference potential is greater than the first reference potential.

16. The engine control system of claim 1 further comprising the fuel injector, wherein the fuel injector is configured to inject fuel directly into the cylinder.

17. An engine control method, comprising:
by a first high side switch, selectively connecting and disconnecting a first reference potential to and from a first node, respectively,
the first node configured to be electrically connected to:
a second node and a first end of a first inductor coil of a fuel injector of a cylinder; and
a first end of a second inductor coil of an oil control valve of the cylinder;
by a second high side switch, selectively connecting and disconnecting a second reference potential to and from the second node, respectively;
by a first low side switch, selectively connecting and disconnecting a ground reference potential to and from a second end of the second inductor coil of the oil control valve of the cylinder, respectively; and
by a second low side switch, selectively connecting and disconnecting the ground reference potential to and from a second end of the first inductor coil of the fuel injector of the cylinder, respectively.

18. The engine control method of claim 17 wherein the second reference potential is greater than the first reference potential.

19. The engine control method of claim 17 further comprising closing the first high side switch and the first low side switch to deactivate opening of intake and exhaust valves of the cylinder.

20. The engine control method of claim 17 further comprising, during a first portion of a fuel injection event for the cylinder:
closing the second high side switch;
closing the second low side switch; and
opening the first high side switch.

* * * * *